US009761127B2

(12) United States Patent
Cheng

(10) Patent No.: US 9,761,127 B2
(45) Date of Patent: Sep. 12, 2017

(54) ELECTROMAGNETIC REMOTE CONTROL AND CONTROL METHOD THEREOF

(71) Applicants: SHENZHEN TCL NEW TECHNOLOGY CO., LTD., Guangdong (CN); Xin Cheng, Guangdong (CN)

(72) Inventor: Xin Cheng, Guangdong (CN)

(73) Assignee: SHENZHEN TCL NEW TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/894,663

(22) PCT Filed: Jan. 24, 2014

(86) PCT No.: PCT/CN2014/071404
§ 371 (c)(1),
(2) Date: Nov. 30, 2015

(87) PCT Pub. No.: WO2015/021756
PCT Pub. Date: Feb. 19, 2015

(65) Prior Publication Data

US 2016/0110996 A1 Apr. 21, 2016

(30) Foreign Application Priority Data

Aug. 15, 2013 (CN) .......................... 2013 1 0356758

(51) Int. Cl.
*G08C 19/12* (2006.01)
*G06F 3/033* (2013.01)
(Continued)

(52) U.S. Cl.
CPC ............. *G08C 17/04* (2013.01); *G08C 17/00* (2013.01)

(58) Field of Classification Search
CPC .......... G08C 19/12; G06F 3/033; G09G 5/08; H01H 9/00; H02K 33/00
(Continued)

(56) References Cited

U.S. PATENT DOCUMENTS 5,844,516 A * 12/1998 Viljanen ................ G08C 17/02 310/36
6,429,767 B1 * 8/2002 Shimomura ........... H01C 10/20 200/6 A (Continued)

FOREIGN PATENT DOCUMENTS

CN 101203821 A 6/2008
CN 101785046 A 7/2010

(Continued)

OTHER PUBLICATIONS

1st Office Action of counterpart Chinese Patent Application No. 201310356758.4 dated Aug. 3, 2016.

(Continued)

*Primary Examiner* — Nam V Nguyen

(57) ABSTRACT

An electromagnetic remote control and control method thereof; when rotating a second rotary disc (20), the repulsive force between a first magnetic piece (30) on the second rotary disc (20) and a second magnetic piece (40) on a first rotary disc (10) is increased; when detecting increase in force on the second magnetic piece (40), transmitting a corresponding control instruction to a controlled device. The controlled terminal can be controlled by rotating the second rotary disc (20) without providing additional function keys, thus the electromagnetic remote control is small and easy to carry.

14 Claims, 8 Drawing Sheets

(51) Int. Cl.

| | |
|---|---|
| ***G09G 5/08*** | (2006.01) |
| ***H01H 9/00*** | (2006.01) |
| ***H02K 33/00*** | (2006.01) |
| ***G08C 17/04*** | (2006.01) |
| ***G08C 17/00*** | (2006.01) |

(58) Field of Classification Search

USPC .......... 340/12.22; 341/173, 176; 310/36, 37; 345/157; 335/205, 206

See application file for complete search history.

(56) References Cited

U.S. PATENT DOCUMENTS

| | | | | |
|---|---|---|---|---|
| 7,310,084 | B2 * | 12/2007 | Shitanaka | H01H 25/04 200/5 A |
| 7,336,006 | B2 * | 2/2008 | Watanabe | G06F 3/016 310/12.25 |
| 7,489,296 | B2 * | 2/2009 | Nishino | G05G 9/047 200/5 R |
| 2011/0007035 | A1 | 1/2011 | Shai | |

FOREIGN PATENT DOCUMENTS

| | | | |
|---|---|---|---|
| CN | 201535896 | U | 7/2010 |
| CN | 101802772 | A | 8/2010 |
| CN | 203086313 | U | 7/2013 |

OTHER PUBLICATIONS

2nd Office Action of counterpart Chinese Patent Application No. 201310356758.4 dated Mar. 17, 2017.

Extended European search report of counterpart European Patent Application No. 14836162.9 dated Mar. 6, 2017.

* cited by examiner

ELECTROMAGNETIC REMOTE CONTROL AND CONTROL METHOD THEREOF

BACKGROUND

Technical Field

The present invention relates to the field of remote control technologies, and in particular, to an electromagnetic remote control and a control method thereof.

Related Art

With the development of science and technology, household appliances such as televisions and air conditioners become more widely applied, and these household appliances are usually controlled by remote controls. However, all existing remote controls, whether universal remote controls or remote controls provided for household appliances, control a controlled electrical appliance by using keys on the remote controls. The remote controls need to be provided with multiple function keys, and therefore have a large volume and are difficult to carry.

SUMMARY

The main objective of the present invention is to provide an electromagnetic remote control and a control method thereof, to make the remote control easy to carry while ensuring that the remote control has a function of controlling a controlled terminal.

An embodiment provides an electromagnetic remote control, where the electromagnetic remote control includes a first rotary disc and a second rotary disc that is rotatably connected to the first rotary disc, where at least one first magnetic piece is disposed on the second rotary disc, at least one second magnetic piece is disposed on the first rotary disc, and polarity of a surface, facing the first rotary disc, of the first magnetic piece is the same as polarity of a surface, facing the second rotary disc, of the second magnetic piece; and the electromagnetic remote control further includes a control circuit that correspondingly generates a remote control signal according to relative locations of the first magnetic piece and the second magnetic piece.

Preferably, the control circuit includes a controller, a pressure sensor electrically connected to the controller and disposed on the first magnetic piece or the second magnetic piece, and a signal transceiver electrically connected to the controller, where when the pressure sensor detects that pressure increases, the controller controls the signal transceiver to generate and send a corresponding remote control signal.

Preferably, the remote control further includes a control key signally connected to the controller, where the controller is configured to: when a signal indicating that the control key is pressed is received, switch a mode of the remote control, enable a pressure sensor corresponding to a current mode of the remote control, and disable other pressure sensors corresponding to other modes of the remote control.

Preferably, two second magnetic pieces are disposed on the first rotary disc relative to the first magnetic piece, and the first magnetic piece is disposed between the two second magnetic pieces.

Preferably, the remote control further includes a menu key signally connected to the controller, where the controller is further configured to: when a signal indicating that the menu key is pressed is received, control the signal transceiver to send a menu invoking instruction; and after the menu invoking instruction is sent and the pressure sensor detects that pressure increases, control the signal transceiver to send a selection instruction.

Preferably, the controlling module is further configured to: when the signal indicating that the menu key is pressed is a continuous signal, control the signal transceiver to send the menu invoking instruction; and when the signal indicating that the menu key is pressed is a transient signal, control the signal transceiver to send a confirmation instruction.

Preferably, multiple scales that correspond to adjustment grades are provided on the first rotary disc.

Preferably, the first rotary disc is ring-shaped.

Preferably, the first rotary disc and the second rotary disc are coaxially arranged.

The present invention further provides a control method of an electromagnetic remote control, including:

detecting a pressure increasing signal generated by a pressure sensor; and sending a corresponding control instruction according to a mapping relationship between a pressure value in the pressure increasing signal and the instruction.

Preferably, before the detecting a pressure increasing signal generated by a pressure sensor, the method further includes:

detecting a trigger signal of a control key;

switching a mode of the remote control when the trigger signal of the control key is detected; and enabling a pressure sensor corresponding to a current mode of the remote control, and disabling other pressure sensors corresponding to other modes of the remote control.

Preferably the sending a corresponding control instruction according to a mapping relationship between a pressure value and the instruction when the pressure increasing signal generated by the pressure sensor is detected includes:

acquiring an instruction type corresponding to the pressure increasing signal when the pressure increasing signal is detected; and sending the corresponding control instruction according to the instruction type and the mapping relationship between the pressure value in the pressure increasing signal and the instruction.

Preferably, before the sending a corresponding control instruction according to a mapping relationship between a pressure value and the instruction when the pressure increasing signal generated by the pressure sensor is detected, the method further includes:

determining, when the pressure increasing signal is detected, whether a pressure decreasing signal is detected within a preset time period;

if the pressure decreasing signal is detected within the preset time period, continuing to detect the pressure increasing signal generated by the pressure sensor; and if no pressure decreasing signal is detected within the preset time period, sending the corresponding control instruction according to the mapping relationship between the pressure value in the pressure increasing signal and the instruction.

The present invention further provides a control method of an electromagnetic remote control, including:

detecting a trigger signal of a menu key;

sending a menu invoking instruction when the trigger signal of the menu key is detected;

detecting a pressure increasing signal generated by a pressure sensor; and sending a menu selection instruction when the pressure increasing signal is detected.

Preferably, after the detecting a trigger signal of a menu key, the method further includes:

determining, when the trigger signal of the menu key is detected, whether the detected trigger signal of the menu key is a continuous signal;

when the detected trigger signal of the menu key is a continuous signal, sending the menu invoking instruction; and when the detected trigger signal of the menu key is a transient signal, sending a confirmation instruction.

According to the electromagnetic remote control and the control method of the electromagnetic remote control provided in the present invention, when the second rotary disc is rotated, repulsive force between the first magnetic piece on the second rotary disc and the second magnetic piece on the first rotary disc increases. When it is detected that pressure on the second magnetic piece increases, a corresponding control instruction is sent to a controlled device. Because the controlled terminal can be controlled by rotating the second rotary disc, the electromagnetic remote control does not need to be provided with extra function keys, and therefore has a small volume and is easy to carry.

Objective achieving, function features, and advantages of the present invention are further described with reference to the embodiments and the accompany drawings.

DETAILED DESCRIPTION

The following further describes the technical solutions of the present invention with reference to the accompanying drawings and specific embodiments. It should be understood that the specific embodiments described herein are only used to explain the present invention, but are not intended to limit the present invention.

Figure 1:
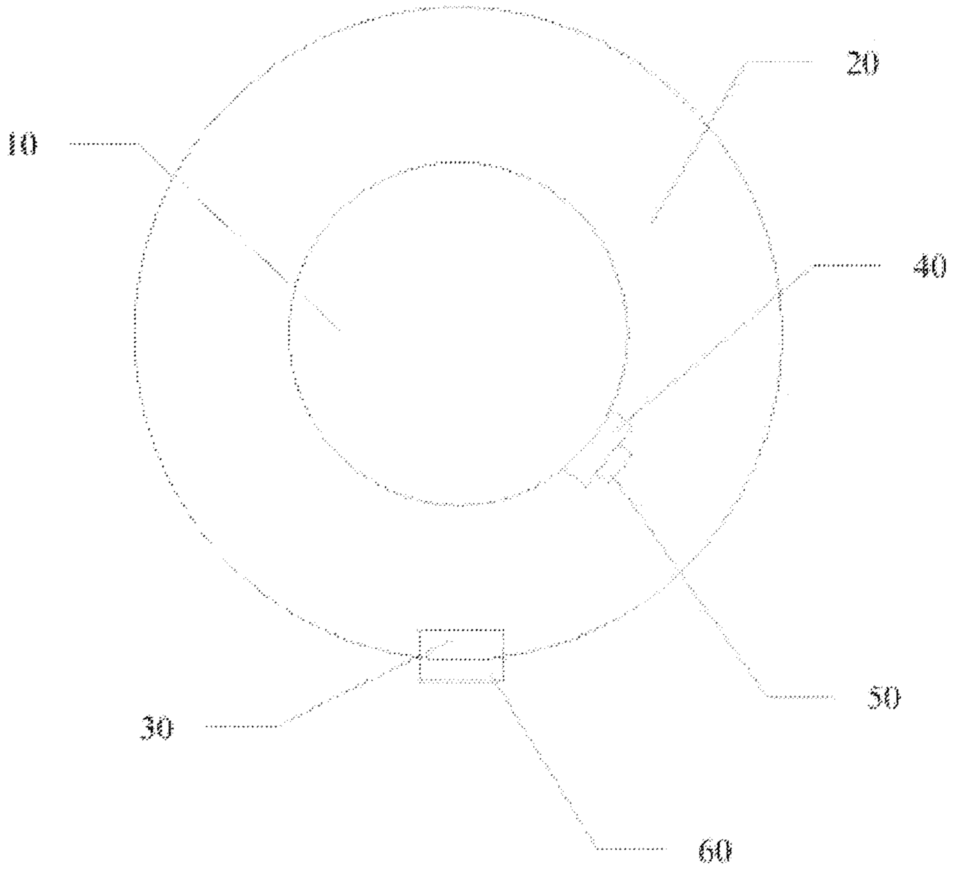
FIG. 1 is a schematic diagram of a location relationship between components in an electromagnetic remote control according to the present invention.
Figure 2:
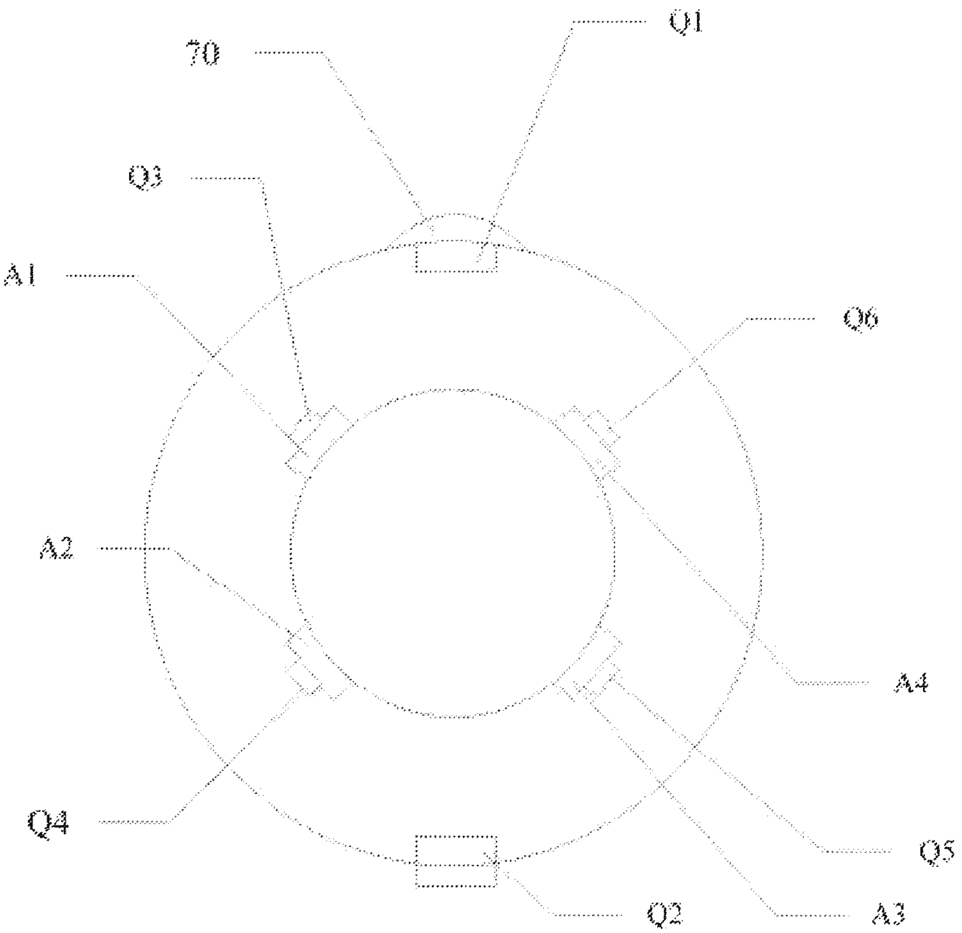
FIG. 2 is a schematic structural diagram of a preferred embodiment of an electromagnetic remote control according to the present invention.

Referring to FIG. 1 and FIG. 2, FIG. 1 is a schematic diagram of a location relationship between components in an electromagnetic remote control according to the present invention, and FIG. 2 is a schematic structural diagram of a preferred embodiment of an electromagnetic remote control according to the present invention.

An embodiment provides an electromagnetic remote control, where the electromagnetic remote control includes a first rotary disc 10 and a second rotary disc 20 that is rotatably connected to the first rotary disc 10, where at least one first magnetic piece 30 is disposed on the second rotary disc 20, at least one second magnetic piece 40 is disposed on the first rotary disc 10, and polarity of a surface, facing the first rotary disc 10, of the first magnetic piece 30 is the same as polarity of a surface, facing the second rotary disc 20, of the second magnetic piece 40; and the electromagnetic remote control further includes a control circuit (not shown in the figure) that corresponding generates a remote control signal according to relative locations of the first magnetic piece 30 and the second magnetic piece 40.

That the first rotary disc 10 is rotatably connected to the second rotary disc 20 means that the second rotary disc 20 can rotate relative to the first rotary disc 10. A preferred solution is that the first rotary disc 10 and the second rotary disc 20 are coaxially arranged, where the first rotary disc 10 and the second rotary disc 20 may be disposed on a same plane or staggered; or the first rotary disc 10 and the second rotary disc 20 may be disposed to have different axes, as long as the first rotary disc 10 are the second rotary disc 20 can rotate relative to each other.

The first magnetic piece 30 and the second magnetic piece 40 may be provided as monopole magnetic pieces, or may be provided as two-pole monopole magnetic pieces such as magnets. Because the polarity of the surface, facing the second rotary disc 20, of the second magnetic piece 40 is the same as the polarity of the surface, facing the first rotary disc 10, of the first magnetic piece 30, repulsive force exists between the first magnetic piece 30 and the second magnetic piece 40. Because the polarities of opposite surfaces of the first magnetic piece 30 and the second magnetic piece 40 are the same, when a user rotates the second rotary disc 20 for control, the nearer the first magnetic piece 30 to the second magnetic piece 40, the repulsive force is greater. The remote control is controlled according to change of the repulsive force. When adjustment is successful, the user may release the second rotary disc 20, and due to the repulsive force, the first magnetic piece 30 goes back to an original location.

As shown in FIG. 2, in this embodiment, the first magnetic piece 30 includes a first magnetic body Q1 and a second magnetic body Q2, and the second magnetic piece 40 includes a third magnetic body Q3, a fourth magnetic body Q4, a fifth magnetic body Q5, and a sixth magnetic body Q6. Surfaces of the third magnetic body Q3, the fourth magnetic body Q4, the fifth magnetic body Q5, and the sixth magnetic body Q6 that face the second rotary disc 20 may be set to an S polarity, and surfaces of the first magnetic body Q1 and the second magnetic body Q2 that face the first rotary disc 10 are set to the S polarity; or the surfaces of the third magnetic body Q3, the fourth magnetic body Q4, the fifth magnetic body Q5, and the sixth magnetic body Q6 that face the second rotary disc 20 may be set to an N polarity, and the surfaces of the first magnetic body Q1 and the second magnetic body Q2 that face the first rotary disc 10 are set to the N polarity; or the surfaces of the third magnetic body Q3 and the sixth magnetic body Q6 that face the second rotary disc 20 may be set to the S polarity, the surface, facing the first rotary disc 10, of the first magnetic body Q1 is set to the S polarity, the surfaces of the fourth magnetic body Q4 and the fifth magnetic body Q5 that face the second rotary disc 20 are set to the N polarity, and the surface of the second magnetic body Q2 that faces the first rotary disc 10 is set to the N polarity.

The first rotary disc 10 is preferably ring-shaped, and can be wore as a finger ring or a bracelet, so that the first rotary disc 10 not only can be used as a decoration, but also can be used as a remote control.

In the electromagnetic remote control provided in this embodiment, when the second rotary disc 20 is rotated, the repulsive force between the first magnetic piece 30 on the second rotary disc 20 and the second magnetic piece 40 on the first rotary disc 10 increases, and when it is detected that pressure between the first magnetic piece 30 and the second magnetic piece 40 increases, a corresponding remote control instruction is sent. Because a controlled terminal can be controlled by rotating the second rotary disc 20, the electromagnetic remote control does not need to be provided with extra function keys, and therefore has a small volume and is easy to carry.

Further, the control circuit (not shown in the figure) includes a controller, a pressure sensor 50 electrically connected to the controller and disposed on the first magnetic piece 30 or the second magnetic piece 40, and a signal transceiver electrically connected to the controller, where when the pressure sensor 50 detects that pressure increases, the controller controls the signal transceiver to generate and send a corresponding remote control signal.

For example, the pressure sensor 50 is installed on the second magnetic piece 40; when the user rotates the second rotary disc 20, the pressure sensor 50 detects that a pressure value increases, and therefore sends a pressure increasing signal to the controller; and after receiving the signal, the controller controls the signal transceiver to generate and send the corresponding remote control signal.

Further, the electromagnetic remote control includes a control key 60 signally connected to the controller, where the controller is configured to: when a signal indicating that the control key 60 is pressed is received, switch a mode of the remote control, enable a pressure sensor 50 corresponding to a current mode of the remote control, and disable other pressure sensors 50 corresponding to other modes of the remote control. Preferably, two second magnetic pieces 40 are disposed on the first rotary disc 10 relative to the first magnetic piece 30, and the first magnetic piece 30 is disposed between the two second magnetic pieces 40.

As shown in FIG. 2, it is set that a first sensor A1 and a second sensor A2 are pressure sensors 50 corresponding to a first mode of the remote control, and a third sensor A3 and a fourth sensor A4 are pressure sensors 50 corresponding to a second mode of the remote control. When the signal indicating that the control key 60 is pressed is received, if the current working mode of the remote control is the first mode, and the working mode of the remote control is switched to the second mode, the third sensor A3 and the fourth sensor A4 are enabled and the first sensor A1 and the second sensor A2 are disabled; and if the current working mode of the remote control is the second mode, and the working mode of the remote control is switched to the first mode, the first sensor A1 and the second sensor A2 are enabled and the third sensor A3 and the fourth sensor A4 are disabled.

A remote control of a television is used as an example for illustration. It is set that the first mode of the remote control a channel adjustment mode, the second mode of the remote control is a volume adjustment mode, and it is preset that the first sensor A1 correspondingly detects a channel increase, the second sensor A2 correspondingly detects a channel decrease, the third sensor A3 correspondingly detects a volume increase, and the fourth sensor A4 correspondingly detects a volume decrease. When the signal indicating that the control key 60 is pressed is received, if the current working mode is the channel adjustment mode, the first sensor A1 and the second sensor A2 are disabled, and the third sensor A3 and the fourth sensor A4 are enabled. In this case, when the second rotary disc 20 is rotated counterclockwise, repulsive force between the second magnetic body Q2 and the fifth magnetic body Q5 increases, and the third sensor A3 detects that pressure increases, and then sends a pressure increasing signal to the controller, and when receiving the pressure increasing signal, the controller controls the signal transceiver to send a volume increasing signal; and when the second rotary disc 20 is rotated clockwise, repulsive force between the first magnetic body Q1 and the sixth magnetic body Q6 increases, and the fourth sensor A4 detects that pressure increases, and then sends a pressure increasing signal to the controller, and when receiving the pressure increasing signal, the controller controls the signal transceiver to send a volume decreasing signal. It should be understood that, when the signal indicating that the control key 60 is pressed is received again, the current working mode is switched from the volume adjustment mode to the channel adjustment mode, the first sensor A1 and the second sensor A2 are enabled, and the third sensor A3 and the fourth sensor A4 are disabled. The first sensor A1 and the second sensor A2 detect that pressure increases and send pressure increasing signals to the controller, and the controller controls the signal transceiver to send a channel increasing signal and a channel decreasing signal separately.

Further, multiple scales may be set on the first rotary disc 10, such as a dial of a clock, where each scale corresponds to an adjustment grade. For example, during volume adjustment, each time the first magnetic piece 30 is rotated by one scale, a volume is adjusted by two grades correspondingly. In this way, the user can perform adjustment clearly without making mistakes.

Preferably, the electromagnetic remote control further includes a menu key 70 signally connected to the controller, where the controller is further configured to: when a signal indicating that the menu key 70 is pressed is received, control the signal transceiver to send a menu invoking instruction; and after the menu invoking instruction is sent and the pressure sensor 50 detects that pressure increases, control the signal transceiver to send a selection instruction.

A remote control of a television is used as an example for illustration. It is preset that the first mode of the remote control is a leftward and rightward selection mode, and the second mode is an upward and downward selection mode, and it is preset that the first sensor A1 correspondingly detects leftward selection, the second sensor A2 correspondingly detects rightward selection, the third sensor A3 correspondingly detects upward selection, and the fourth sensor A4 correspondingly detects downward selection. When receiving the signal indicating that the menu key 70 is pressed, the controller controls the signal transceiver to send the menu invoking instruction, and after receiving the menu invoking instruction, the television invokes a corresponding menu, and at this time, the television enters a menu mode; and when the signal indicating that the menu key 60 is pressed is received, if the current working mode of the remote control is the leftward and rightward selection mode, the first sensor A1 and the second sensor A2 are disabled, and the third sensor A3 and the fourth sensor A4 are enabled. In this case, when the second rotary disc 20 is rotated counterclockwise, repulsive force between the second magnetic body Q2 and the fifth magnetic body Q5 increases, and the third sensor A3 detects that pressure increases, and then sends a pressure increasing signal to the controller, and when receiving the pressure increasing signal, the controller controls the signal transceiver to send an upward selection signal, and when receiving the upward selection signal, the television can control a selection cursor of the menu to move upward; and when the second rotary disc 20 is rotated clockwise, repulsive force between the first magnetic body Q1 and the sixth magnetic body Q6 increases, and the fourth sensor A4 detects that pressure increases, and then sends a pressure increasing signal to the controller, and when receiving the pressure increasing signal, the controller controls the signal transceiver to send a downward selection signal, and when receiving the downward selection signal, the television can control the selection cursor of the menu to move downward. It should be understood that, when the television is still in the menu mode and the signal indicating that the control key 60 is pressed is received again, the current working mode of the remote control is switched from the upward and downward selection mode to the leftward and rightward selection mode, the first sensor A1 and the second sensor A2 are enabled, and the third sensor A3 and the fourth sensor A4 are disabled. The first sensor A1 and the second sensor A2 detect that pressure increases and send pressure increasing signals to the controller, and the controller controls the signal transceiver to send a leftward selection signal and a rightward selection signal separately.

Further, the controller is further configured to: when the signal indicating that the menu key 70 is pressed is a continuous signal, control the signal transceiver to send the menu invoking instruction; and when the signal indicating that the menu key 70 is pressed is a transient signal, control the signal transceiver to send a confirmation instruction.

Functions of invoking a menu and confirmation may be implemented simultaneously by using the menu key 70. A signal indicating that the menu key 70 is long pressed may be set to a menu invoking signal, and a signal indicating that the menu key 70 is short pressed may be set to a confirmation signal. When the signal indicating that the menu key 70 is long pressed is received by the remote control, the controller controls the signal transceiver to send the menu invoking instruction and send, according to the detected pressure increasing signal, the selection instruction to the user, for example, an upward selection instruction, and after the user selects a corresponding menu option, the user may short press the menu key 70 to send the confirmation instruction to the controlled terminal. It should be understood that the menu key 70 and the confirmation key may also be set separately.

Figure 3:
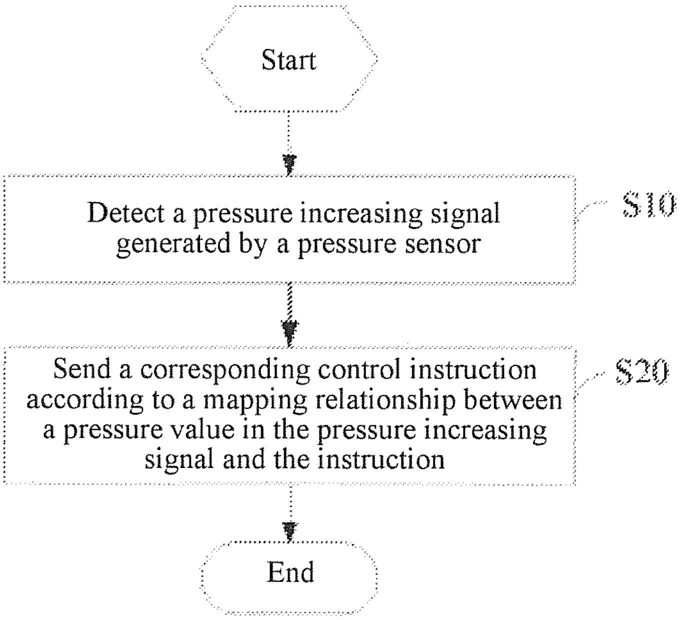
FIG. 3 is a schematic flowchart of a first embodiment of a control method of an electromagnetic remote control according to the present invention.

Referring to FIG. 3, FIG. 3 is a schematic flowchart of a first embodiment of a control method of an electromagnetic remote control according to the present invention.

The control method of an electromagnetic remote control provided in this embodiment includes:

Step S10: Detect a pressure increasing signal generated by a pressure sensor.

As shown in FIG. 2, because polarities of opposite surfaces of the first magnetic piece 30 and the second magnetic piece 40 are the same, when relative locations of the first magnetic piece 30 and the second magnetic piece 40 change, the pressure sensor 50 detects that repulsive force between the first magnetic piece 30 and the second magnetic piece 40 changes; therefore, when the relative locations of the first magnetic piece 30 and the second magnetic piece 40 become gradually closer, pressure between the first magnetic piece 30 and the second magnetic piece 40 increases, and at this time, the pressure sensor 50 generates a pressure increasing signal, where the pressure increasing signal includes a pressure value detected by the pressure sensor 50.

Step S20: Send a corresponding control instruction according to a mapping relationship between a pressure value in the pressure increasing signal and the instruction.

In the electromagnetic remote control provided in this embodiment, when the second rotary disc 20 is rotated, repulsive force between the first magnetic piece 30 on the second rotary disc 20 and the second magnetic piece 40 on the first rotary disc 10 increases, and when it is detected that a pressure value between the first magnetic piece 30 and the second magnetic piece 40 increases, a corresponding remote control instruction is sent according to a mapping relationship between the pressure value and the instruction. Because a controlled terminal can be controlled by rotating the second rotary disc 20, the electromagnetic remote control does not need to be provided with extra function keys, and therefore has a small volume and is easy to carry.

Figure 4:
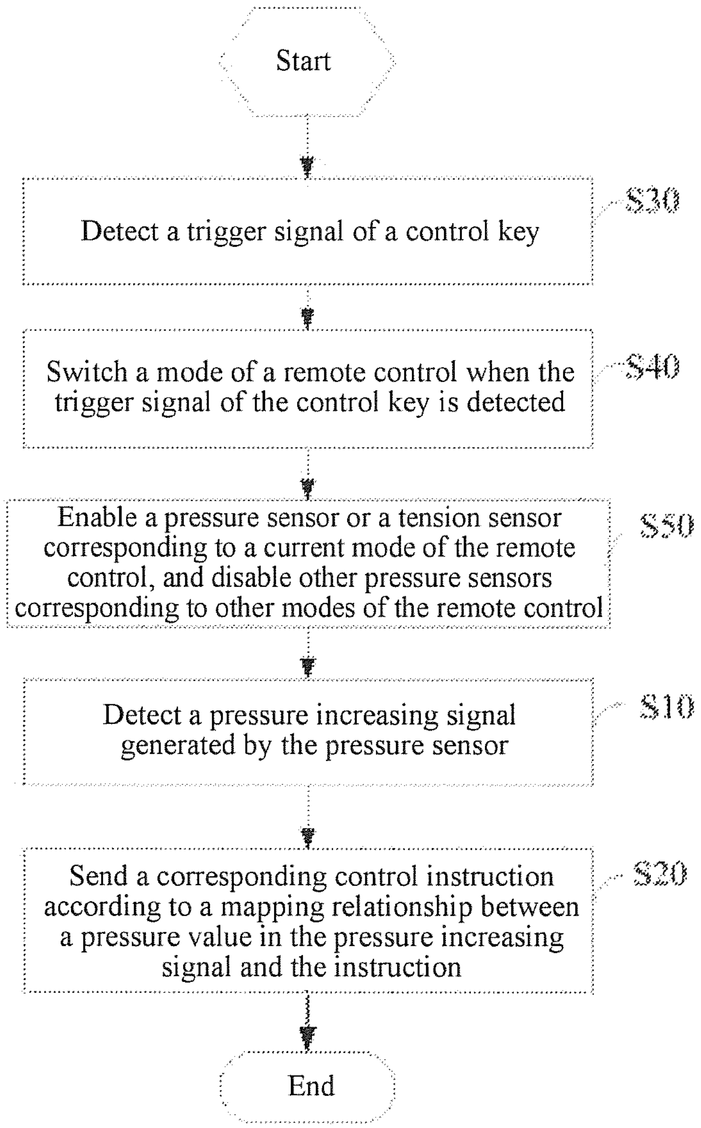
FIG. 4 is a schematic flowchart of a second embodiment of a control method of an electromagnetic remote control according to the present invention.

Referring to FIG. 4, FIG. 4 is a schematic flowchart of a second embodiment of a control method of an electromagnetic remote control according to the present invention.

Based on the foregoing embodiment, the second embodiment of the control method of an electromagnetic remote control according to the present invention is provided. In this embodiment, before step S10, the method further includes:

Step S30: Detect a trigger signal of a control key.

Step S40: Switch a mode of the remote control when the trigger signal of the control key is detected.

Step S50: enable a pressure sensor corresponding to a current mode of the remote control, and disable other pressure sensors corresponding to other modes of the remote control.

As shown in FIG. 2, it is set that the first sensor A1 and the second sensor A2 are the pressure sensors 50 corresponding to the first mode of the remote control, and the third sensor A3 and the fourth sensor A4 are the pressure sensor 50 corresponding to the second mode of the remote control. When the signal indicating that the control key 60 is pressed (triggered) is received, if the current working mode of the remote control is the first mode, and the working mode of the remote control is switched to the second mode, the third sensor A3 and the fourth sensor A4 are enabled and the first sensor A1 and the second sensor A2 are disabled; and if the current working mode of the remote control is the second mode, and the working mode of the remote control is switched to the first mode, the first sensor A1 and the second sensor A2 are enabled and the third sensor A3 and the fourth sensor A4 are disabled.

Figure 5:
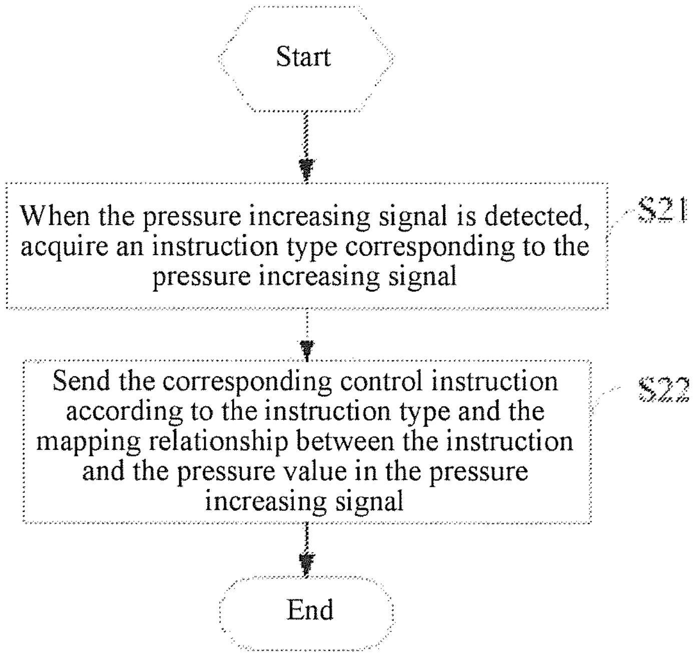
FIG. 5 is a specific schematic flowchart of step S20 in FIG. 3.

Referring to FIG. 5, FIG. 5 is a specific schematic flowchart of step S20 in FIG. 3.

In the first embodiment and the second embodiment, step S20 specifically includes:

Step S21: When the pressure increasing signal is detected, acquire an instruction type corresponding to the pressure increasing signal.

Step S22: Send the corresponding control instruction according to the instruction type and the mapping relationship between the instruction and the pressure value in the pressure increasing signal.

With reference to FIG. 2, the remote control of the television is used as an example for illustration. It is set that the first mode of the remote control is the channel adjustment mode, and the second mode of the remote control is the volume adjustment mode, and it is preset that the first sensor A1 correspondingly detects a channel increase, the second sensor A2 correspondingly detects a channel decrease, the third sensor A3 correspondingly detects a volume increase, and the fourth sensor A4 correspondingly detects a volume decrease. When the signal indicating that the control key 60 is pressed is received, if the current working mode is the channel adjustment mode, the first sensor A1 and the second sensor A2 are disabled and the third sensor A3 and the fourth sensor A4 are enabled. In this case, when the second rotary disc 20 is rotated counterclockwise, the repulsive force between the second magnetic body Q2 and the fifth magnetic body Q5 increases, and the third sensor A3 detects that pressure increases, and then sends a pressure increasing signal to the controller, and when receiving the pressure increasing signal, the controller controls the signal transceiver to send a volume increasing signal; and when the second rotary disc 20 is rotated clockwise, the repulsive force between the first magnetic body Q1 and the sixth magnetic body Q6 increases, and the fourth sensor A4 detects that pressure increases, and then sends a pressure increasing signal to the controller, and when receiving the pressure increasing signal, the controller controls the signal transceiver to send a volume decreasing signal.

During instruction sending, a corresponding instruction may be sent according to the mapping relationship between the instruction and the pressure value, for example, during volume adjustment, a larger pressure value indicates that the volume can be adjusted quicker.

Figure 6:
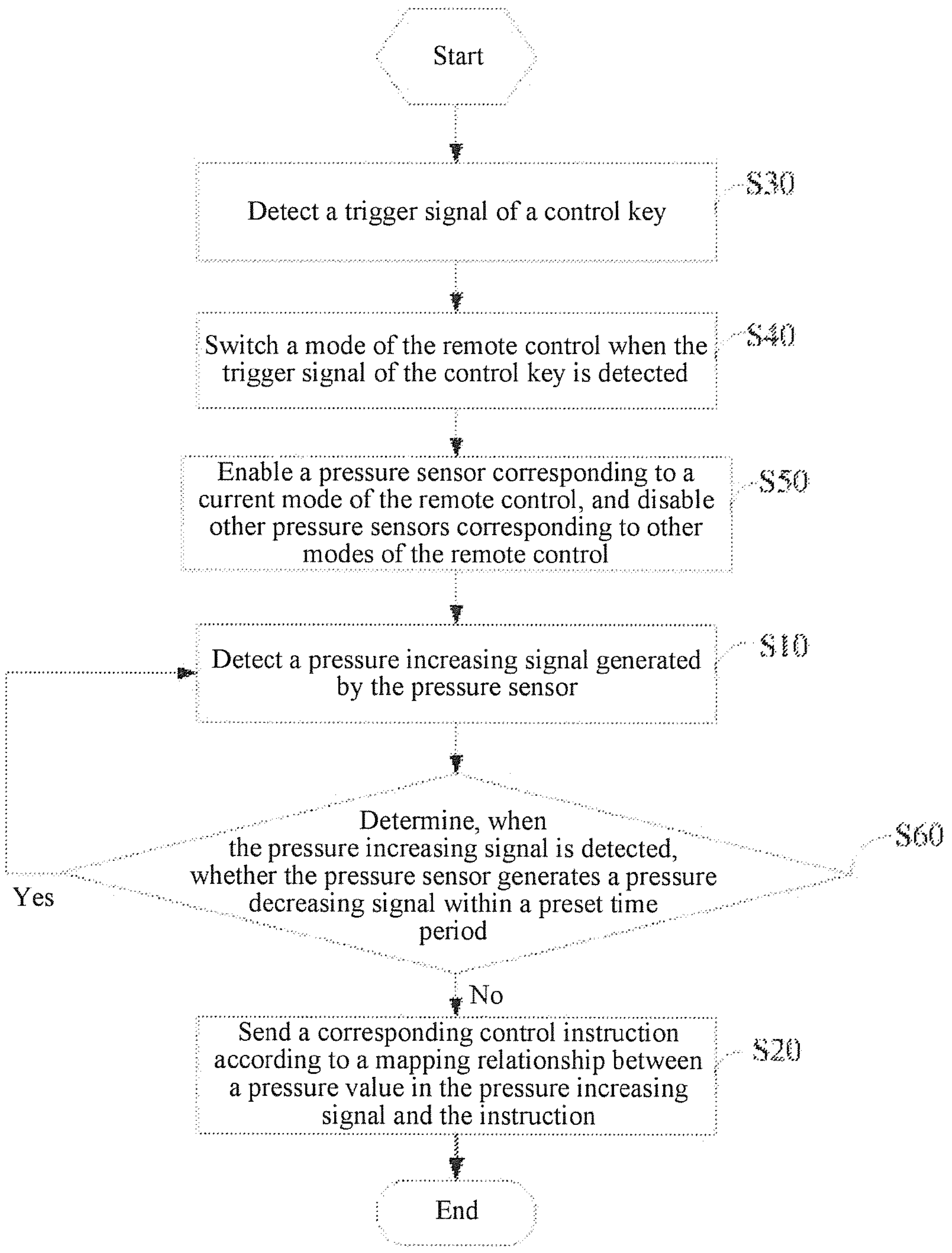
FIG. 6 is a schematic flowchart of a third embodiment of a control method of an electromagnetic remote control according to the present invention.

Referring to FIG. 6, FIG. 6 is a schematic flowchart of a third embodiment of a control method of an electromagnetic remote control according to the present invention.

Based on the second embodiment, the third embodiment of the control method of an electromagnetic remote control according to the present invention is provided. In this embodiment, before step S20, the method further includes:

Step S60: Determine, when the pressure increasing signal is detected, whether the pressure sensor generates a pressure decreasing signal within a preset time period; if no, perform step S20 of sending a corresponding control instruction according to a mapping relationship between a pressure value in the pressure increasing signal and the instruction; and if yes, continue to perform step S10 of detecting a pressure increasing signal generated by a pressure sensor.

To avoid that the user rotates too much at once to perform re-adjustment, a time interval may be preset, and if the pressure sensor generates the pressure decreasing signal within the time interval, it indicates that the user releases the second rotary disc to perform re-adjustment, and therefore, the controller may perform no operation, and continues to detect the pressure decreasing signal generated by the pressure sensor, and if no pressure decreasing signal is detected within the time interval, it indicates that the user wants to perform adjustment at this location, and therefore, a corresponding control instruction is sent.

Figure 7:
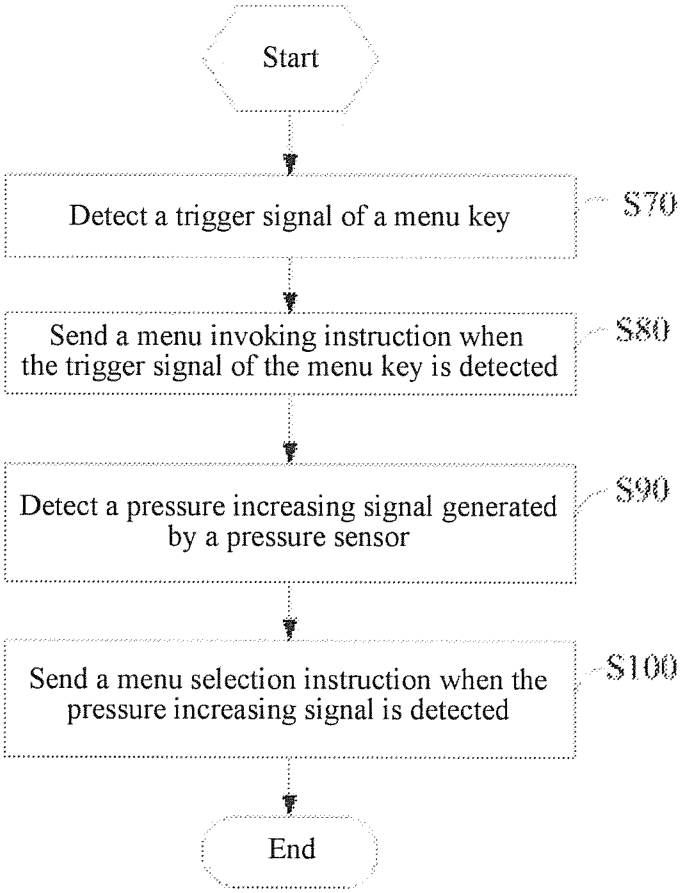
FIG. 7 is a schematic flowchart of a fourth embodiment of a control method of an electromagnetic remote control according to the present invention.

Referring to FIG. 7, FIG. 7 is a schematic flowchart of a fourth embodiment of a control method of an electromagnetic remote control according to the present invention.

The control method of an electromagnetic remote control provided in this embodiment includes:

Step S70: Detect a trigger signal of a menu key.

Step S80: Send a menu invoking instruction when the trigger signal of the menu key is detected.

Step S90: Detect a pressure increasing signal generated by a pressure sensor.

Step S100: Send a menu selection instruction when the pressure increasing signal is detected.

With reference to FIG. 2, the remote control of the television is used as an example for illustration. It is preset that the first mode of the remote control is the leftward and rightward selection mode, and the second mode is the upward and downward selection mode, and it is preset that the first sensor A1 correspondingly detects a leftward selection, the second sensor A2 correspondingly detects a rightward selection, the third sensor A3 correspondingly detects an upward selection, and the fourth sensor A4 correspondingly detects a downward selection. When receiving the signal indicating that the menu key 70 is pressed, the controller controls the signal transceiver to send the menu invoking instruction, and after receiving the menu invoking instruction, the television invokes a corresponding menu; and when the signal indicating that the menu key 60 is pressed is received, if the current working mode of the remote control is the leftward and rightward selection mode, the first sensor A1 and the second sensor A2 are disabled, and the third sensor A3 and the fourth sensor A4 are enabled. In this case, when the second rotary disc 20 is rotated counterclockwise, the repulsive force between the second magnetic body Q2 and the fifth magnetic body Q5 increases, and the third sensor A3 detects that pressure increases, and then sends a pressure increasing signal to the controller, and when receiving the pressure increasing signal, the controller controls the signal transceiver to send an upward selection signal, and when receiving the upward selection signal, the television can control the selection cursor of the menu to move upward; and when the second rotary disc 20 is rotated clockwise, the repulsive force between the first magnetic body Q1 and the sixth magnetic body Q6 increases, and the fourth sensor A4 detects that pressure increases, and then sends a pressure increasing signal to the controller, and when receiving the pressure increasing signal, the controller controls the signal transceiver to send a downward selection signal, and when receiving the downward selection signal, the television can control the selection cursor of the menu to move downward.

Figure 8:
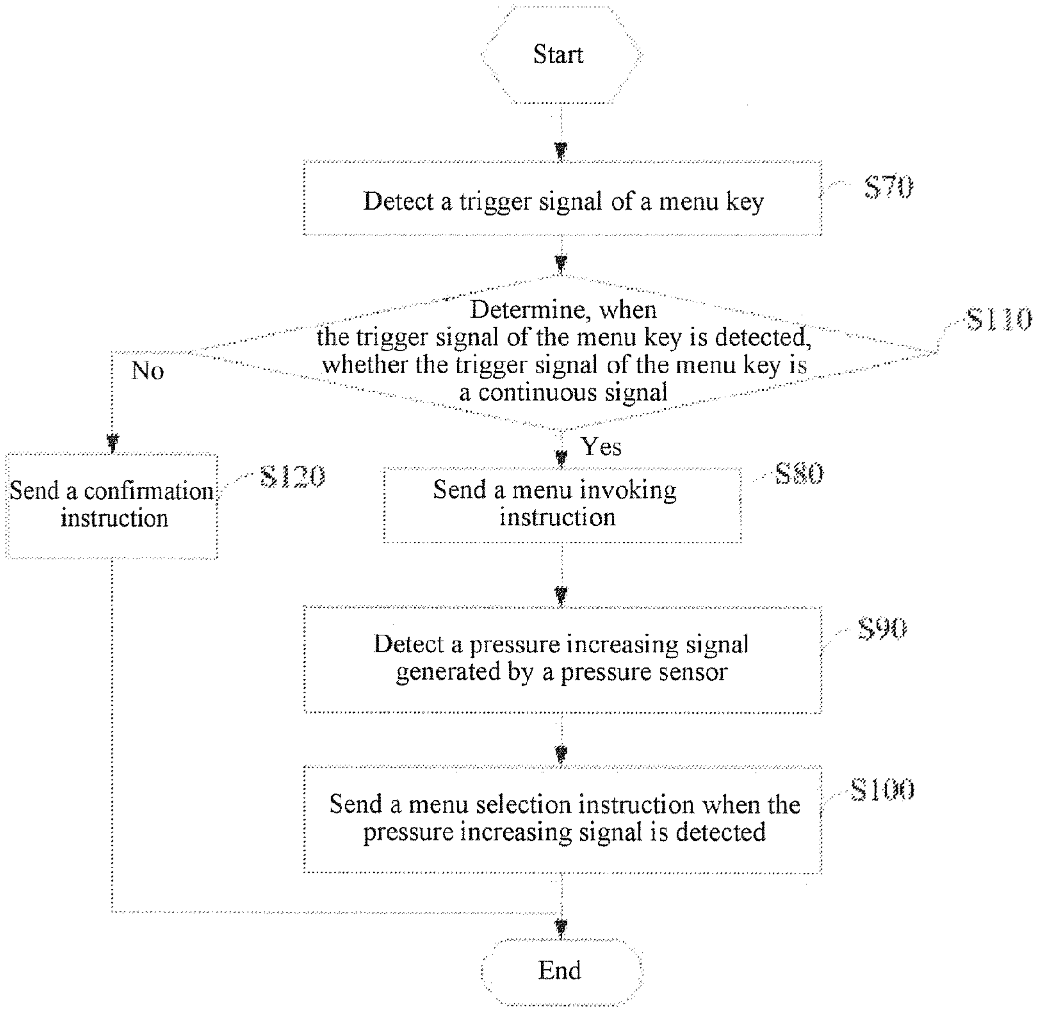
FIG. 8 is a schematic flowchart of a fifth embodiment of a control method of an electromagnetic remote control according to the present invention.

Referring to FIG. 8, FIG. 8 is a schematic flowchart of a fifth embodiment of a control method of an electromagnetic remote control according to the present invention.

Based on the fourth embodiment, the fifth embodiment of the control method of an electromagnetic remote control according to the present invention is provided. In this embodiment, before step S80, the method further includes:

step S110: determine, when the trigger signal of the menu key is detected, whether the trigger signal of the menu key is a continuous signal; if yes, perform step S80 "send a menu invoking instruction", and if no, perform step S120; and Step S120: Send a confirmation instruction.

The functions of invoking a menu and confirmation may be implemented simultaneously by using the menu key. A signal indicating that the menu key is long pressed may be set to a menu invoking signal, and a signal indicating that the menu key is short pressed may be set to a confirmation signal. When the signal indicating that the menu key is long pressed is received by the remote control, the controller controls the signal transceiver to send the menu invoking instruction and send, according to the detected pressure increasing signal, the selection instruction to the user, for example, an upward selection instruction, and after the user selects a corresponding menu option, the user may short press the menu key to send the confirmation instruction to the controlled terminal. It should be understood that the menu key and the confirmation key may also be set separately.

The foregoing descriptions are merely preferred embodiments of the present invention, and the patent scope of the present invention is not limited thereto. All equivalent structure changes made according to the content of this specification and accompanying drawings in the present invention or by directly or indirectly applying the present invention in other related technical fields shall fall within the patent protection scope of the present invention.

What is claimed is:

1. An electromagnetic remote control, wherein the electromagnetic remote control comprises a first rotary disc and a second rotary disc that is rotatably connected to the first rotary disc, wherein at least one first magnetic piece is disposed on the second rotary disc, at least one second magnetic piece is disposed on the first rotary disc, and polarity of a surface, facing the first rotary disc, of the first magnetic piece is the same as polarity of a surface, facing the second rotary disc, of the second magnetic piece; and the electromagnetic remote control further comprises a control circuit that correspondingly generates a remote control signal according to relative locations of the first magnetic piece and the second magnetic piece, the control circuit comprises a controller, a pressure sensor electrically connected to the controller and disposed on the first magnetic piece or the second magnetic piece, and a signal transceiver electrically connected to the controller, wherein when the pressure sensor detects that pressure increases, the controller controls the signal transceiver to generate and send a corresponding remote control signal.

2. The remote control according to claim 1, further comprising: a control key signally connected to the controller, wherein the controller is configured to: when a signal indicating that the control key is pressed is received, switch a mode of the remote control, enable a pressure sensor corresponding to a current mode of the remote control, and disable other pressure sensors corresponding to other modes of the remote control.

3. The remote control according to claim 1, wherein two second magnetic pieces are disposed on the first rotary disc relative to the first magnetic piece, and the first magnetic piece is disposed between the two second magnetic pieces.

4. The remote control according to claim 1, further comprising: a menu key signally connected to the controller, wherein the controller is further configured to: when a signal indicating that the menu key is pressed is received, control the signal transceiver to send a menu invoking instruction; and after the menu invoking instruction is sent and the pressure sensor detects that pressure increases, control the signal transceiver to send a selection instruction.

5. The remote control according to claim 4, wherein the controller is further configured to: when the signal indicating that the menu key is pressed is a continuous signal, control the signal transceiver to send the menu invoking instruction; and when the signal indicating that the menu key is pressed is a transient signal, control the signal transceiver to send a confirmation instruction.

6. The remote control according to claim 1, wherein multiple scales that correspond to adjustment grades are provided on the first rotary disc.

7. The remote control according to claim 1, wherein the first rotary disc is ring-shaped.

8. The remote control according to claim 1, wherein the first rotary disc and the second rotary disc are coaxially disposed.

9. A control method of the electromagnetic remote control according to claim 2, comprising: detecting a pressure increasing signal generated by the pressure sensor; and sending a corresponding control instruction according to a mapping relationship between a pressure value in the pressure increasing signal and the instruction.

10. The method according to claim 9, before the detecting a pressure increasing signal generated by the pressure sensor, further comprising:

- detecting a trigger signal of the control key;
- switching the mode of the remote control when the trigger signal of the control key is detected; and
- enabling the pressure sensor corresponding to the current mode of the remote control, and disabling the other pressure sensors corresponding to the other modes of the remote control.

11. The method according to claim 10, wherein the sending a corresponding control instruction according to a mapping relationship between a pressure value and the instruction when the pressure increasing signal generated by the pressure sensor is detected comprises:

- acquiring an instruction type corresponding to the pressure increasing signal when the pressure increasing signal is detected; and
- sending the corresponding control instruction according to the instruction type and the mapping relationship between the pressure value in the pressure increasing signal and the instruction.

12. The method according to claim 10, wherein before the sending a corresponding control instruction according to a mapping relationship between a pressure value and the instruction when the pressure increasing signal generated by the pressure sensor is detected, the method further comprises:

- determining, when the pressure increasing signal is detected, whether a pressure decreasing signal is detected within a preset time period;
- if the pressure decreasing signal is detected within the preset time period, continuing to detect the pressure increasing signal generated by the pressure sensor; and
- if no pressure decreasing signal is detected within the preset time period, sending the corresponding control instruction according to the mapping relationship between the pressure value in the pressure increasing signal and the instruction.

13. A control method of the electromagnetic remote control according to claim 4, comprising: detecting a trigger signal of the menu key; sending the menu invoking instruction when the trigger signal of the menu key is detected; detecting a pressure increasing signal generated by the pressure sensor; and sending the menu selection instruction when the pressure increasing signal is detected.

14. The method according to claim 13, after the detecting a trigger signal of the menu key, further comprising:

- determining, when the trigger signal of the menu key is detected, whether the detected trigger signal of the menu key is a continuous signal;
- when the detected trigger signal of the menu key is a continuous signal, sending the menu invoking instruction; and
- when the detected trigger signal of the menu key is a transient signal, sending the confirmation instruction.

* * * * *